United States Patent [19]

Heaton

[11] Patent Number: 5,057,469

[45] Date of Patent: Oct. 15, 1991

[54] PREPARATION OF IRON NITROSYL CARBONYL CATALYST

[75] Inventor: Duane E. Heaton, Lake Jackson, Tex.

[73] Assignee: The Dow Chemical Company, Midland, Mich.

[21] Appl. No.: 578,108

[22] Filed: Sep. 5, 1990

[51] Int. Cl.$^5$ .................. B01J 38/68; B01J 21/20; B01J 21/18; C01B 21/12

[52] U.S. Cl. .................. 502/24; 423/139; 423/140; 423/150; 423/365; 423/386; 423/417; 502/161; 502/174; 502/200; 585/369; 585/370

[58] Field of Search ............ 502/24, 29, 31, 33, 502/174, 161, 200; 585/369, 370; 423/365, 386, 417, 139, 140, 150

[56] References Cited

U.S. PATENT DOCUMENTS

| | | | |
|---|---|---|---|
| 2,473,993 | 6/1949 | Gresham et al. | 502/161 |
| 3,377,397 | 4/1968 | Maxfield | 585/369 |
| 3,448,129 | 6/1969 | Maxfield | 556/28 |
| 3,481,710 | 12/1969 | Maxfield | 423/386 |
| 3,510,533 | 5/1970 | Maxfield | 585/369 |
| 3,551,467 | 12/1970 | Akakawa et al. | 556/140 |
| 3,954,665 | 5/1976 | Tkatchenko | 502/161 |
| 4,144,278 | 3/1979 | Strope | 585/508 |
| 4,181,707 | 1/1980 | Strope | 423/386 |
| 4,234,454 | 11/1980 | Strope | 502/162 |
| 4,238,301 | 12/1980 | Petit et al. | 204/59 R |
| 4,973,568 | 11/1990 | Heaton | 502/417 |

OTHER PUBLICATIONS

Heindirk tom Dieck et al., Chem.-Ing.-Tech. 61, pp. 832–833 (1989).

D. Ballivet-Tkatchenko, Inorganica Chimica Acta, vol. 30, pp. 2-289-L290 (1978).

E. Le Roy et al., Tetrahedron Letters, vol. 27, pp. 2403–2406 (1978).

P. L. Maxfield, Inorg. Nucl. Chem. Letters, vol. 6, pp. 707–711 (1970).

J. P. Candlin et al., J. Chem. Soc. (C), pp. 1856–1860 (1968).

I. Tkatchenko, Journal of Organometallic Chemistry, vol. 124, pp. C39–C42 (1977).

Gerald E. Gadd et al., Organometallics, pp. 391–397 (1987).

A. Mortreux et al., Applied Catalysis, vol. 24, pp. 1–15 (1986).

*Primary Examiner*—Paul E. Konopka

[57] ABSTRACT

Iron nitrosyl carbonyl catalyst is prepared by dissolving impure iron nitrosyl carbonyl in a solvent solution, then adding sufficient miscible non-solvent to the solution to result in separation of the mixture into an upper layer and a lower layer containing iron nitrosyl carbonyl. Preferably, the solvent is used in preparation of the iron nitrosyl carbonyl, and the solution is, therefore, the product of the preparation. The miscible non-solvent is added to the product solution to effect separation of layers for isolation of purified iron nitrosyl carbonyl product.

24 Claims, No Drawings

PREPARATION OF IRON NITROSYL CARBONYL CATALYST

BACKGROUND OF THE INVENTION

The present invention relates to a process for the preparation of iron nitrosyl carbonyl, more particularly to an improvement in that process.

The complex iron nitrosyl carbonyl [Fe(NO)$_2$(CO)$_2$], is known to dimerize butadiene to produce vinyl cyclohexene (VCH). Methods known to prepare various iron nitrosyl complexes require reduction of [Fe(NO)$_2$Cl]$_2$ or reaction of nitric oxide (NO) on a mixture of iron and FeCl$_3$. Reference to these methods is found in U.S. Pat. No.4,238,301. Another patent, U.S. Pat. No. 4,234,454, discloses the preparation of various metal nitrosyl catalytic solutions by employing the combination of manganese, zinc or tin together with iron, cobalt or nickel nitrosyl halides to produce the respective metal nitrosyls in a system for dimerizing various conjugated dienes. An earlier patent, U.S. Pat. No. 3,510,533, discloses the dimerization of conjugated dienes with π-allyldinitrosyliron complexes and a method for their preparation. Several methods are given involving the reduction of a $\mu,\mu'$-dihalotetranitrosyldiiron. Additionally, iron nitrosyl carbonyl is prepared by a process of reducing iron, cobalt or nickel chlorides and an alkali metal nitrite or iron, cobalt or nickel nitrosyl chlorides with carbon monoxide (CO) in the presence of a readily oxidizable metal as taught in copending U.S. application Ser. No. 07,348,625 filed May 8, 1989 (Heaton).

These methods produce a product which admits of further purification. Purification, such as distillation, usually involves vaporizing the iron nitrosyl carbonyl using heat and trapping the product, e.g. using dry ice or dry ice and acetone. Such purifications are disadvantageous in that they involve heat which may decompose product and involve additional steps and equipment which can result in loss of product. Other disadvantages include need for large scale cryogenic equipment to trap product.

It would be desirable to purify iron nitrosyl carbonyl without use of additional heat and preferably as part of the preparation of the material rather than in a separate process.

SUMMARY OF THE INVENTION

In one aspect, the present invention is a process for preparing iron nitrosyl carbonyl catalyst in a reaction mixture, the improvement comprising preparing the catalyst in a solvent solution then adding sufficient miscible non-solvent to the solution to result in separation of the mixture into an upper layer and a lower layer containing iron nitrosyl carbonyl. The catalyst is concentrated in a lower layer separated from reactants and by-products soluble in the solvent.

In another aspect, the invention is a process for purifying iron nitrosyl carbonyl catalyst by dissolving impure iron nitrosyl carbonyl in a solvent solution, then adding sufficient miscible non-solvent to the solution to result in separation of the mixture into an upper layer and a lower layer containing iron nitrosyl carbonyl.

Processes of the invention result in iron nitrosyl carbonyl of increased purity which is more useful for use as a catalyst for dimerizing diolefins such as butadiene than is less pure iron nitrosyl carbonyl. Using iron nitrosyl carbonyl of increased purity results in less formation of solids during dimerization.

DETAILED DESCRIPTION OF THE INVENTION

The process of the invention is suitable for iron nitrosyl carbonyl produced by any process within the skill in the art, particularly those processes which can be carried out in a solvent having a miscible non-solvent. If a process is not suitably carried out in such a solvent, the iron nitrosyl carbonyl is dissolved in the solvent after preparation in another medium. The process of the invention is particularly useful for purifying the product of reacting in a solution (a) iron, cobalt or nickel chlorides and an alkali metal nitrite or (b) iron, cobalt or nickel nitrosyl carbonyls with (c) carbon monoxide in a solvent therefor in the presence of a readily oxidizable metal or electrochemically such as is taught in copending U.S. patent application Ser. No. 07,348,625, filed May 8, 1989 (Heaton) and U.S. patent application Ser. No. 07,578,110 filed Sept. 5, 1990 which are incorporated herein by reference in their entireties.

The solvent is any solvent for iron nitrosyl carbonyl and the reactants used to prepare it, which solvent has a miscible non-solvent. Such solvents include tetrahydrofuran (THF), dibutyl ether, diethyl ether, dimethoxyethane, propylene carbonate, acetonitrile, dimethylformamide, or, preferably, diglyme. The solvent is preferably also a solvent for impurities which are present.

The miscible non-solvent is any liquid miscible with the solvent which is not a solvent for iron nitrosyl carbonyl, that is which dissolves less than about 50 grams/liter (g/l) of iron nitrosyl carbonyl at 25° C. Such non-solvents include water, ethanol. and methanol, hexane, pentane, heptane, nonane, decane and isomers and mixtures of these and/or other saturated or nearly saturated hydrocarbons, preferably water or octane. Hydrocarbon non-solvents such as octane are preferably used when the catalyst is to be used in a non-polar or aprotic system. Water, methanol or ethanol is preferably used when polar or protic compounds are suitable in subsequent reactions, e.g. the process catalyzed by the iron nitrosyl carbonyl.

The iron nitrosyl carbonyl is dissolved in sufficient solvent to dissolve the amount of iron nitrosyl carbonyl present. Preferably there is little more than sufficient solvent, but frequently there is additional solvent because of the method by which the iron nitrosyl carbonyl is prepared. More preferably there is at least about 0.5 percent by weight nitrosyl carbonyl catalyst in the solvent.

The non-solvent is added to the iron nitrosyl carbonyl solvent solution (hereinafter crude catalyst). Sufficient non-solvent is added to result in separation of the solution into two layers. Hydrocarbon non-solvents such as octane are preferably added in weight ratios of crude catalyst to hydrocarbon of from about 3:1 to about 1:10, more preferably from about 2:1 to about 1:3. Water, methanol or ethanol is preferably added in weight ratios of crude catalyst to non-solvent of from about 2:1 to about 1:10, more preferably from about 1:1 to about 1:4.

Addition of non-solvent to solvent suitably takes place at any convenient temperature which is insufficient to substantially increase solubility of product in the non-solvent, preferably about ambient temperatures, i.e. about 25° C. Advantageously, mixing is sufficient to achieve complete mixing of solvent and non-solvent, but insufficient to increase solubility of product in the non-solvent, thus, mixing preferably occurs for a time minimal to achieve complete mixing.

The following examples are representative of the catalyst preparation and its use. Examples (Ex.) of the invention are designated numerically, while Comparative Samples (C.S.) are designated alphabetically. All percentages, ratios and parts are by weight unless designated otherwise.

EXAMPLE 1

Preparation and Purification of Crude Catalyst Solution

The following are mixed in a sealed autoclave, 33.20 g Sn (tin) powder, 9.18 g (sodium nitrite) $NaNO_2$ and 12.51 g $FeCl_3$ (ferric chloride) in 235 g diglyme. The reactor is pressurized to 160 psig with CO and heated to 100° C. for three days with stirring. After cooling to 25° C. and settling, the resulting solution (of crude catalyst) is filtered through 1 micron filters and stored under 60 psig of CO for 2 days.

To 6.90 g of the filtered solution is added 6.90 g n-octane. The solution and octane are mixed, and a deep red layer separates out and settles to the bottom. It is removed and found to weigh 0.85 g. The product is identified by infrared spectroscopy by peaks at 2088 (medium), 2039 (strong), 1804 (strong), and 1761 (strong) $cm^{-1}$.

The 0.85 g of red material is diluted to 10.00 g with propylene carbonate as a solvent, and 5.00 g of n-octane is added as a gas chromatography (G.C.) standard to form a mixture. The mixture is added to 130 g of butadiene at 80° C., and stirred at 300 psig $N_2$ for eight hours. Analysis by gas chromatography shows 78 mole percent conversion to vinyl cyclohexene (VCH). Absence of precipitating solids in the dimerization indicates that the catalyst is highly pure.

EXAMPLE 2

Purification of the Crude Catalyst using Water

To 32.62 g of the crude catalyst solution of Example 1, is added 65.00 g water ($H_2O$). The solution is mixed with the water, and a deep red layer separates out and settles to the bottom, leaving a yellow-orange upper layer. The lower layer, which has a deep red color indicative of iron carbonyl nitrosyl, is removed and found to weight 0.60 g. A 0.22 g sample of the lower layer is diluted to 10.00 g with propylene carbonate, and 5.00 g of n-octane is added to form a mixture. The mixture is added to 130 g of butadiene at 80° C., and stirred at 300 psig $N_2$ for eight hours. Analysis by gas chromatography shows 91 mole percent conversion to VCH.

These reactions compare well with 98 mole percent conversion of butadiene to VCH when 0.22 g of pure $Fe(NO)_2(CO)_2$ is used under the same conditions.

What is claimed is:

1. A process for preparing iron nitrosyl carbonyl catalyst in a reaction mixture, the improvement comprising preparing the catalyst in a solvent solution then adding miscible non-solvent to the solution to result in separation of the mixture into an upper layer and a lower layer containing iron nitrosyl carbonyl.

2. The process of claim 1 wherein the solvent is tetrahydrofuran (THF), dibutyl ether, diethyl ether, dimethoxyethane, propylene carbonate, acetonitrile, dimethylformamide, diglyme, or mixtures thereof.

3. The process of claim 2 wherein the solvent is diglyme.

4. The process of claim 1 wherein there is at least about 0.5 weight percent iron nitrosyl carbonyl in the solvent.

5. The process of claim 1 wherein there is less than about 50 g/l of iron nitrosyl carbonyl are soluble in the non-solvent at 25° C.

6. The process of claim 1 wherein the non-solvent is water, ethanol or methanol or mixtures thereof.

7. The process of claim 6 wherein the weight ratio of crude catalyst to non-solvent is from about 2:1 to about 1:10.

8. The process of claim 7 wherein the weight ratio of crude catalyst to non-solvent is from about 1:1 to about 1:4.

9. The process of claim 1 wherein the non-solvent is a saturated or nearly saturated hydrocarbon or mixtures thereof.

10. The process of claim 9 wherein the non-solvent is hexane, pentane, heptane, octane, nonane, decane or isomers or mixtures thereof.

11. The process of claim 9 wherein the weight ratio of crude catalyst to non-solvent is from about 3:1 to about 1:10.

12. The process of claim 11 wherein the weight ratio of crude catalyst to non-solvent is from about 2:1 to about 1:3.

13. A process for purifying iron nitrosyl carbonyl catalyst by dissolving impure iron nitrosyl carbonyl in a solvent solution, then adding sufficient miscible non-solvent to the solution to result in separation of the mixture into an upper layer and a lower layer containing iron nitrosyl carbonyl.

14. The process of claim 13 wherein the solvent is tetrahydrofuran (THF), dibutyl ether, diethyl ether, dimethoxyethane, propylene carbonate, acetonitrile, dimethylformamide or diglyme.

15. The process of claim 14 wherein the solvent is diglyme.

16. The process of claim 13 wherein there is at least about 0.5 weight percent iron nitrosyl carbonyl in the solvent.

17. The process of claim 13 wherein there is less than about 50 g/l of iron nitrosyl carbonyl are soluble in the non-solvent at 25° C.

18. The process of claim 13 wherein the non-solvent is water, ethanol or methanol or mixtures thereof.

19. The process of claim 18 wherein the weight ratio of crude catalyst to non-solvent is from about 2:1 to about 1:10.

20. The process of claim 18 wherein the weight ratio of crude catalyst to non-solvent is from about 1:1 to about 1:4.

21. The process of claim 13 wherein the non-solvent is a saturated or nearly saturated hydrocarbon or mixtures thereof.

22. The process of claim 21 wherein the non-solvent is hexane, pentane, heptane, octane, nonane, decane or isomers or mixtures thereof.

23. The process of claim 21 wherein the weight ratio of crude catalyst to non-solvent is from about 3 1 to about 1:10.

24. The process of claim 22 wherein the weight ratio of crude catalyst to non-solvent is from about 2:1 to about 1:3.

* * * * *